United States Patent

Fujimoto

[15] 3,700,884
[45] Oct. 24, 1972

[54] DEVICE FOR ADJUSTING POSITION OF LIGHT SOURCE FOR PROJECTORS AND THE LIKE

[72] Inventor: Sakae Fujimoto, Tokyo, Japan
[73] Assignee: Ricoh Co., Ltd., Tokyo, Japan
[22] Filed: Nov. 10, 1970
[21] Appl. No.: 88,304

[30] Foreign Application Priority Data

Nov. 12, 1969 Japan......................44/107399

[52] U.S. Cl..................................240/44.2, 353/87
[51] Int. Cl..............................................F21v 19/02
[58] Field of Search........240/44, 44.2, 41.6; 353/87; 352/198

[56] References Cited

UNITED STATES PATENTS 1,791,298  2/1931  Arbuckle..................240/44.2
1,879,650  9/1932  Wollensak et al. ...240/44.2 X
1,602,898  10/1926  Godley.....................240/44.2

*Primary Examiner*—Samuel S. Matthews
*Assistant Examiner*—Richard M. Sheer
*Attorney*—Henry T. Burke, Robert Scobey, Robert S. Dunham, P. E. Henninger, Lester W. Clark, Gerald W. Griffin, Thomas F. Moran, R. Bradlee Boal, Christopher C. Dunham and John F. Scully

[57] ABSTRACT

A device is provided for precisely positioning a light source in the optical system of a projector or the like, especially relative to a condenser system and a reflecting mirror. It consists of two position adjustment members, one being adjustable along two coordinate axes and the other being adjustable along the third coordinate axis. It is extremely compact in size, especially in thickness and is well adapted for miniaturization of a projector or the like. It is also very simple in operation to attain a highly uniform field with high luminance.

2 Claims, 2 Drawing Figures

PATENTED OCT 24 1972  3,700,884

INVENTOR.
SAKAE FUJIMOTO
BY Henry T. Burke
ATTORNEY

DEVICE FOR ADJUSTING POSITION OF LIGHT SOURCE FOR PROJECTORS AND THE LIKE

BACKGROUND OF THE INVENTION:

The present invention relates to generally a projector and the like and more particularly a device for adjusting the position of a light source for projectors and the like. The device is capable of three-dimensional adjustment of the position of the light source and is extremely compact in size, especially in thickness.

When a highly uniform field with high luminance is required by, for instance, an overhead projector, the position of a filament of a light source relative to a reflecting mirror and a condenser lens must be aligned with a higher degree of accuracy. Especially when the distance between the projector and a screen must be longer with a high magnification, the adjustment of the position of the light source with a higher degree of accuracy is a very important factor for ideal projection.

However, the prior art devices for three-dimensional adjustment of a light source are generally complex in mechanism and operation, as well as large in size and heavy in weight, so that they do not serve to miniaturize the projectors and the like.

SUMMARY OF THE INVENTION

It is therefore an object of the present invention to provide a device for projectors and the like capable of three-dimensional adjustment of the position of a light source, which device is compact in size, especially in thickness and simple in operation.

The device for adjusting the position of a light source for projectors in accordance with the present invention comprises a base detachably attached to the projector frame, a main adjustment member which is mounted to the base by means adapted to adjust the vertical and angular position of the main adjustment member relative to the base, an auxiliary adjustment member rotatably mounted to the main adjustment member and supporting a socket for a light source, and means to adjust the angular position of the auxiliary adjustment member relative to the main adjustment member. The base, main and auxiliary adjustment members, and adjustment means are all made of a metal and designed to be substantially flat.

The present invention will become more apparent from the following description of the preferred embodiment thereof taken in conjunction with the accompanying drawings.

Figure 1:
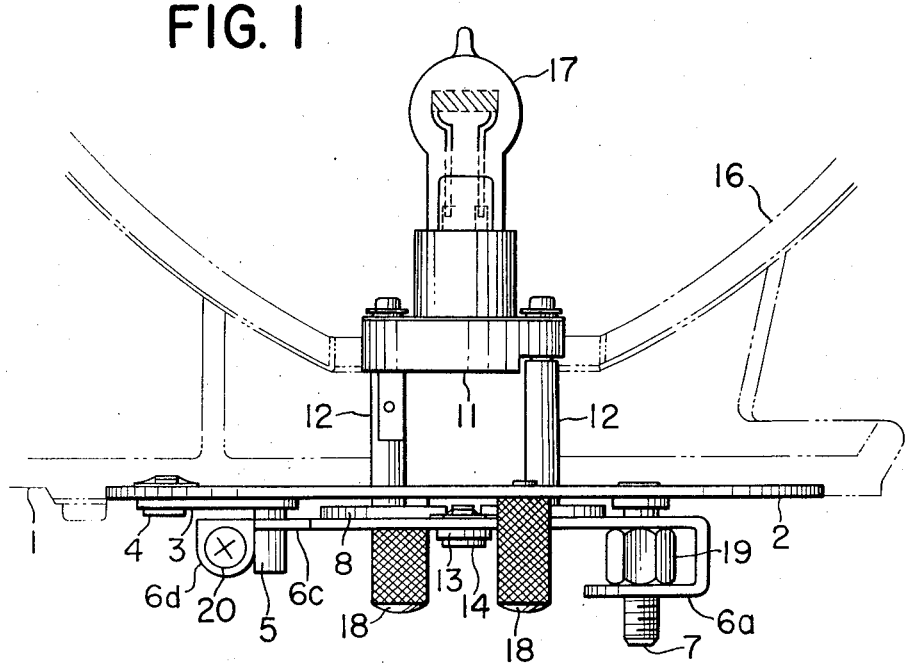
FIG. 1 is a side view of a device in accordance with the present invention.
Figure 2:
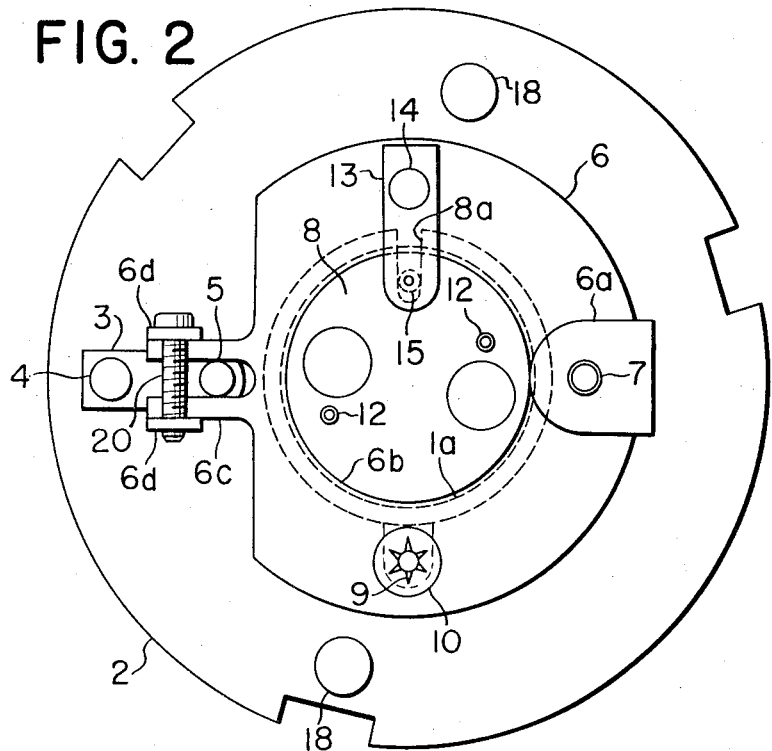
FIG. 2 is a bottom view thereof.

DESCRIPTION OF THE PREFERRED EMBODIMENT:

Referring to FIGS. 1 and 2, a base 2 of, for example, a bayonet mount type and having a center aperture 1a is detachably attached to a frame 1 of an overhead projector. The base 2 is mounted by a pair of knobs 18 for attachment to and detachment from the frame 1. One end of a lever 3 is pivotably mounted on a shaft 4 to the base 2, and an upright pin 5 extends from the other end of the lever 3.

A main adjustment member 6 is provided with a bent portion 6a U-shaped in cross section (See FIG. 1), a center aperture 6b, a bifurcated portion 6c in diametrically opposed relation with the bent portion 6a and a pair of upright portions 6d extending from the free ends of the arms of the bifurcated portion 6c. The main adjustment member 6 is rotatably mounted on the base 2 by a threaded rod 7 extending through the bent portion 6a, and is also slidable along the axis of the threaded rod 7. A nut 19 threadably mounted on the threaded rod 7 is snugly fitted into the space defined by the leg portions of the U-shaped bent portion 6a of the main adjustment member 6. A screw 20 is threadably connected through the pair of upright portions 6d, so that when the screw 20 is tightened, the pin 5 fitted into the bifurcated portion 6d may be clamped in position, whereby the rotation as well as the vertical movement of the main adjustment member 6 may be positively prevented.

An auxiliary adjustment member 8 supporting the legs 12 of a socket 11 for receiving a projecting lamp 17 such as an iodine lamp has its one end rotatably connected to the main adjustment member 6 by a shaft 9 and a washer 10 and has a groove 8a formed in diametrically opposed relation with the shaft 9 and adapted to receive therein a pin 15 extending from one end of an adjustment lever 13 whose other end is rotatably mounted by a shaft 14 to the main adjustment member 6.

An ellipsoidal reflector 16 securely fixed to the frame 1 reflects the light beams from the lamp 17 toward a projection lens (not shown).

Next the mode of operation will be described.

For the vertical adjustment of the light source 17, first the screw 20 is loosened and then the nut 19 is rotated so that the main adjustment member 6 is caused to move vertically along the threaded rod 7 and the pin 5 to a desired position. Thereafter the screw 20 may be tightened again so that the main adjustment member 6 may be locked in the desired position.

For the adjustment of the position of the light source 17 in the direction substantially perpendicular to the paper of FIG. 1, first the screw 20 is loosened so that the main adjustment member 6 may be rotated about the threaded rod 7 by the lever 3 to a desired position. Thereafter, the screw 20 is tightened so that the main adjustment member 6 may be securely locked in the desired angular position.

For the adjustment in the horizontal direction, that is the adjustment to the right or left in FIG. 1, the adjustment lever 13 is rotated about its shaft 14 so that the auxiliary adjustment member 8 may be rotated about its shaft 9 to a desired position. In consequence, the light source 17 may be displaced to a desired position. In this case, the washer 10 must have a suitable locking force in order to ensure that the auxiliary adjustment member 8 may be securely held in desired position.

The base 2, lever 3, main and auxiliary adjustment members 6 and 8 and adjustment lever 13 are all made of a metal and designed so flat that the device may become very compact in size, especially in thickness.

What is claimed is:

1. A device for adjusting the position of a light source adapted for mounting on the frame of a projector comprising:

a. a flat base member detachably secured to said frame and having:
   i. a first flat lever member pivoted at one end to said base member and having a first upstanding pin extending away from said base member on its opposite end; and
   ii. a threaded rod fixed to said base member diametrically opposite said first lever member and extending in the same direction as said first upstanding pin;
b. a first flat adjustment member having a first aperture therein for receiving said threaded rod and means thereon cooperating with said threaded rod and said first upstanding pin by which said first adjustment member is mounted to said base member for adjustment of the spacing between said base member and said first adjustment member and for adjustment in one angular direction in a plane parallel to that of said base member; and
c. a second flat adjustment member carrying the light source and pivotably mounted on said first flat adjustment member for adjusting the position of the light source in another angular direction in a plane parallel to that of said base member by means including:
   i. a pivot on said first adjustment member; and
   ii. a second flat lever member pivotally mounted on said first adjustment member and having a second pin thereon extending into a groove in said second adjustment member.

2. A device as in claim 1 wherein said cooperating means on said first flat adjustment member comprises:
   i. a bent portion at an edge of said first adjustment member with an extension thereon having a second aperture therein disposed opposite said first aperture and for receiving said threaded rod;
   ii. a nut member threadably mounted on said threaded rod between said first and second apertures;
   iii. a pair of arms extending from said first adjustment member diametrically opposite said bent portion for receiving said first upstanding pin between them and having aperture means thereon for receiving a screw member; and
   iv. a screw member threadably mounted through said aperture means for releasably clamping said first pin between said pair of arms.

* * * * *